United States Patent [19]

Columbus et al.

[11] Patent Number: 5,473,005

[45] Date of Patent: * Dec. 5, 1995

[54] THIXOTROPIC ADHESIVE GEL

[75] Inventors: Peter S. Columbus, Melville, N.Y.; John Anderson, Hilliard; Yogeshbhai B. Patel, Gahanna, both of Ohio

[73] Assignee: Borden, Inc., Columbus, Ohio

[*] Notice: The portion of the term of this patent subsequent to Feb. 8, 2011, has been disclaimed.

[21] Appl. No.: 193,963

[22] Filed: Feb. 9, 1994

Related U.S. Application Data

[63] Continuation-in-part of Ser. No. 976,553, Nov. 16, 1992, Pat. No. 5,284,897, Ser. No. 77,023, Jun. 15, 1993, Pat. No. 5,306,749, and Ser. No. 150,435, Nov. 10, 1993, Pat. No. 5,322,880.

[51] Int. Cl.$^6$ .................. C08F 2/16; C08K 3/20; C08L 9/04
[52] U.S. Cl. .................. 524/459; 524/44; 524/45; 524/55; 524/57; 524/916
[58] Field of Search ................ 524/44, 45, 55, 524/57, 459, 916

[56] References Cited

U.S. PATENT DOCUMENTS

| | | | |
|---|---|---|---|
| 2,510,257 | 6/1950 | Robinson | 260/29.6 |
| 3,256,221 | 6/1966 | Cooper | 260/17 |
| 3,442,845 | 5/1969 | Columbus et al. | 260/29.6 |
| 3,676,174 | 7/1972 | Specter | 117/26 |
| 3,896,073 | 7/1975 | Smith | 524/460 |
| 4,251,400 | 2/1981 | Columbus | 260/8 |
| 4,282,120 | 8/1981 | Cisterni | 260/17.4 |
| 4,638,022 | 1/1987 | Cope | 524/15 |
| 4,722,954 | 2/1988 | Hallsworth | 524/55 |
| 4,767,839 | 11/1990 | Carpenter et al. | 166/293 |
| 5,190,997 | 3/1993 | Lindemann et al. | 524/94 |
| 5,284,897 | 2/1994 | Columbus et al. | 524/459 |
| 5,306,749 | 4/1994 | Columbus et al. | 524/13 |
| 5,322,880 | 6/1994 | Columbus et al. | 524/459 |

FOREIGN PATENT DOCUMENTS

| | | | |
|---|---|---|---|
| 0210052 | 1/1987 | European Pat. Off. | B65D 35/14 |

OTHER PUBLICATIONS

Handbook of Water Soluble Gums and Resins by R. L. Davidson, 180, McGraw-Hill, pp. 20–20, 20–18, 20–19, 21–15, 21–16.

Handbook of Adhesives, Third Ed., I. Skiest, pp. 388–390, 394–395, and 398.

Kelzan, Xanthan Gum, (Tech. Bulletin D13–15) of Merck & Co.

Kelco, Xanthan Gum, 3rd Ed., of Kelco a Division of Merck & Co.

*Primary Examiner*—George F. Lesmes
*Assistant Examiner*—Blaine R. Copenheaver
*Attorney, Agent, or Firm*—Stevens, Davis, Miller & Mosher

[57] ABSTRACT

A water based thixotropic adhesive gel is disclosed which contains: water; polyvinyl alcohol, or wherein a portion of the polyvinyl alcohol is replaced with polyvinylpyrrolidone; xanthan gum to impart thixotropic properties to the gel; and a plasticizer for the polyvinyl alcohol. The gel has a thixotropic index which permits the viscosity of the adhesive to break down when a flexible tube or squeeze bottle dispenser is finger-pressed while having a sufficiently low viscosity to allow for easy extrusion from an orifice having a diameter of about 0.06 to 0.15 inches. When pressure is released, after the desired amount of adhesive has flown out of the dispenser, the adhesive quickly reverts to very close to its original gel state so that it does not run on a vertical surface of porous or semiporous material such as paper. Preferred gels contain a water soluble dye and are clear.

20 Claims, No Drawings

THIXOTROPIC ADHESIVE GEL

This application is a continuation-in-part of U.S. application Ser. No. 08/077,023, filed Jun. 15, 1993, now U.S. Pat. No. 5,306,749 and a continuation-in-part of U.S. application Ser. No. 08/150,435 filed Nov. 10, 1993, now U.S. Pat. No. 5,322,880 and a continuation-in-part of U.S. application Ser. No. 07/976,553, filed Nov. 16, 1992, now U.S. Pat. No. 5,284,897.

BACKGROUND OF THE INVENTION

1. Field of the Invention

This invention relates to a thixotropic, water based general purpose, polyvinyl alcohol adhesive gel for porous and semiporous substrates such as paper, card board, cloth and wood.

2. Background Art

Many different general purpose adhesives are available for adhering porous and semiporous substrates such as paper. However, such adhesives have shortcomings for use in projects which are performed on wall boards and other vertical surfaces such as in a class room by young children.

The gels of this invention contain water, polyvinyl alcohol, and xanthan gum within certain proportions so as to provide viscosities and a thixotropic index within certain ranges. Optionally, the gel includes a diphenyl methane dye to provide color to the gel. Preferably, the gel consists essentially of: water; a partially hydrolyzed polyvinyl alcohol; xanthan gum; a water-soluble defoamer; and a water-soluble plasticizer for the polyvinyl alcohol which does not destroy the clarity of the gel. Optionally, other ingredients can be added which do not destroy the advantageous properties of the gel. Compatible preservatives and dyes are generally added to the gel.

Our copending applications Ser. No. 07/976,553 filed Nov. 16, 1992 and its divisional 08/150,435 filed on Nov. 10, 1993, both of which are incorporated herein in their entirety by reference, relate to clear, thixotropic aqueous adhesive gels containing water, partially hydrolyzed polyvinyl alcohol, various polymeric thickening agents such as about 0.5% to 1.5% of xanthan gum, colorants, a water soluble plasticizer for the polyvinyl alcohol, and a defoamer. Our copending application Ser. No. 08/077,023 filed on Jun. 15, 1993, which is also incorporated herein in its entirety by reference, relates to an aqueous thixotropic adhesive gel containing water, polyvinyl acetate, polyvinyl alcohol, wood flour, glyoxal, and xanthan gum as the thickening agent.

Applicants have found that smaller quantities of the xanthan gum from that recited in their copending applications filed on Nov. 16, 1992 and Nov. 10, 1993 are operable and the color of water soluble triphenyl methane dyes in the gels of these copending cases has better stability in sunlight when xanthan gum is used in comparison to the use of the sodium salt of carboxymethylcellulose (CMC) which is the preferred gum in these copending cases.

SUMMARY OF THE INVENTION

In one aspect of the invention, a clear, water based polyvinyl alcohol adhesive gel is provided which contains xanthan gum which provides thixotropic properties to the gel. A water-soluble plasticizer for the polyvinyl alcohol and a water-soluble defoamer in the composition assist in meeting the desirable properties of the gel. Due to its thixotropic properties, the viscosity of the adhesive will break down when a flexible tube or squeeze bottle is finger-pressed and have a sufficiently low viscosity to allow for easy extrusion from a small orifice such as one having a diameter of about 0.06 to 0.15 inches. When pressure is released after the desired amount of adhesive flows out of the orifice, the adhesive quickly reverts to very close to its original gel state so that a horizontal line of the gel will not run when applied to a vertical surface of a porous substrate such as paper.

In another aspect, the adhesive gel is crystal clear or transparent.

In still another aspect, the adhesive gel has a strong wet tack with a low rate of set. This holds a second substrate in position with a first substrate in a vertical plane after contact of the substrates with the gel while permitting sliding and repositioning of the second substrate for a prolonged period of time prior to formation of permanent adhesion and fiber tearing bonds due to setting of the adhesive.

In a further aspect of the invention, a portion of the polyvinyl alcohol adhesive polymer is replaced with polyvinylpyrrolidone.

In still a further aspect, the gels of this invention contain a dye or colorant.

Additional aspects of the invention will be evident from a reading of the entire specification and claims.

Advantages of the invention include: (1) The adhesive gel will not run when applied to porous and semiporous vertical surfaces and will not spill when used as a general purpose school glue. (2) The adhesive gel extrudes easily and in a steady stream from a small orifice when a flexible tube or squeeze bottle is finger pressed and reverts to gel when finger-pressure is released. (3) The combination of adhesive gel and small dispenser opening, e.g. from about 0.06 inches to 0.15 inches in diameter, minimizes or eliminates wrinkling of paper upon drying of the adhesive. (4) The adhesive in a clear resilient plastic dispenser can be viewed within the dispenser as clear which may include a tint of color. (5) The adhesive gel is preferably crystal clear or has a clear colored tint and provides a clear dry film. (6) The dry adhesive film is flexible and will not crack on bending. (7) The adhesive gel has a strong wet-tack to hold paper surfaces together while drying. (8) It has a long rate of set so as to permit sliding and positioning of substrates before fiber tearing permanent adhesive bonds are developed. (9) The adhesive gel as well as dried films thereof will launder-out in hot or cold water. (10) The adhesive gel can be tinted easily with non-toxic water-soluble dyes. (11) The adhesive gel is non-toxic and is not an irritant to the skin and eyes as defined in the Federal Hazardous Substances Act. (12) Color of triphenyl methane dyes in the gel is more stable than with the use of thickening agents such as the sodium salt of carboxymethylcellulose (CMC).

DETAILED DESCRIPTION OF THE INVENTION

The preferred adhesive gels of this invention are clear. The term "clear" is used herein in contrast to opaque. The term "clear" includes transparent, i.e., see through, as well as translucent.

The term "water-soluble" as used herein refers to solutions of either solids or liquids which are soluble or miscible in water to provide a solution which is clear at the concentration employed.

The "thixotropic index" is the difference in viscosity for the gel from an undisturbed state to that wherein the gel is being displaced by force. The term "thixotropic" as used herein is also meant to cover pseudoplastic. The thixotropic index used in this invention permits extrusion of the gel from the dispenser opening by use of finger-pressure on a flexible dispenser such as a tube or squeeze bottle. The adhesive rapidly reverts to a higher viscosity after extrusion from the orifice. The adhesive gel does not run, i.e. extensive spreading without the application of external force, when applied to paper in a vertical plane when extruded through the small orifices of the dispensers used in this invention.

The thixotropic index for the adhesive gel of this invention varies from about 1.5 to 4.5 preferably about 1.5 to 4 and particularly 1.8 to 2.5. The thixotropic index used herein is obtained by dividing the viscosity reading of the gel at 2 RPM (revolutions per minute) by the viscosity reading at 20 RPM by use of an RVF Brookfield viscometer using a number 6 spindle at 25° C. The viscosity readings are taken after the gel has been at rest e.g. undisturbed, for a period of time such as 12 hours after any agitation or other disturbance of the gel structure. It should be noted that different methods for measuring thixotropic index will give different results.

The adhesive gels of this invention have a viscosity of about 6,000 cps (centipoise) to 80,000 cps at 25° C., preferably about 8,000 cps to 70,000 cps at 25° C., and particularly about 10,000 to 40,000 cps at 25° C. as measured with an RVF Brookfield viscometer by use of a number 6 spindle at 2 RPM (revolutions per minute). When measured at 20 RPM with an RVF Brookfield viscometer at 25° C. by use of a No. 6 spindle, the viscosity is about 3,500 cps to 50,000 cps, preferably about 7,000 cps to 25,000 cps, provided that the thixotropic index is within the ranges set forth herein.

The major ingredient in the adhesive gel of this invention is water. The quantity of water can vary over a broad range such as that from about 70% to 93% by weight of the adhesive gel, preferably 75% to 93% and particularly from about 80% to 90% by weight thereof.

It has been found that triphenyl methane colors such as FD&C Blue No. 1 of the clear gels of the parent cases filed on Nov. 16, 1992 and Nov. 10, 1993 fade on exposure to sunlight when the sodium salt of carboxymethylcellulose (CMC) is the gelling agent whereas such fading is minimized when xanthan gum is used as the gelling agent. The time it takes for a sample such as that of EXAMPLE 1 in these parent cases to loose its blue tint can be as short as one day or less in direct sunlight. On the other hand, when xanthan gum was used instead of CMC, there was no color fading under substantially the same test conditions. Additionally, CMC loses some of its viscosity during such exposure to sunlight whereas this does not happen with xanthan gum.

Polyvinyl Alcohol Adhesive Polymer

The adhesive agent used in this invention is partially hydrolyzed polyvinyl alcohol or such polyvinyl alcohol with polyvinylpyrrolidone (PVP) wherein the PVP replaces up to about half of the polyvinyl alcohol. The polyvinyl alcohol will normally have a molecular weight of about 25,000 to 100,000 and preferably about 40,000 to 80,000. The viscosity of the polyvinyl alcohol can vary over a wide range such as that of about 5 or 6 cps, which is referred to in the art as low viscosity, to 40 to 50 cps, which is referred to in the art as high viscosity as measured with an LVF Brookfield viscometer using a number 1 spindle at 60 RPM at 20° C. for a 4% aqueous solution. The preferred degree of hydrolysis for the partially hydrolyzed polyvinyl alcohol is 87% to 89%.

The PVP can have a molecular weight, expressed as a K value, which varies over a wide range such as that of a K value of about 26 to 100.

The quantity of polyvinyl alcohol or polyvinyl alcohol together with PVP in the gel can vary over a wide range such as that of from about 5% to 25% by weight of the adhesive gel, preferably from about 5% to 20% and particularly 10% to 15% by weight of the adhesive gel.

Xanthan Gum

The thickening agent polymer used in this invention is xanthan gum. Xanthan gum is a natural high-molecular weight branched polysaccharide. It functions as a hydrophilic colloid to thicken, suspend, and stabilize water-based systems. The quantity of xanthan gum used in this invention is that which is sufficient to provide the adhesive gel with the desired thixotropic index and viscosity. Such quantity can vary over a broad range such as that of about 0.1% to 1.5% by weight of the adhesive, preferably the quantity of xanthan gum will vary from about 0.2% to 0.8% by weight of the adhesive and particularly from 0.3 to 0.7%.

The Water-Soluble Plasticizer

Any water-soluble plasticizer for the polyvinyl alcohol, which does not destroy the clarity of the gel is suitable for use in this invention. Such plasticizers soften the polyvinyl alcohol, make the adhesive stickier, and assist in making the dried film easier to wash out of clothing. Illustrative of such plasticizers there can be mentioned: alkanes having from 2 to 5 carbon atoms and 2 to 3 hydroxyl groups such as: propylene glycol; glycerol; ethylene glycol; and diethylene glycol; although ethylene glycol and diethylene glycol can have some toxic properties. The quantity of the water-soluble plasticizer is that which is sufficient to plasticize the polyvinyl alcohol and will generally vary from about 0.5 to 3% by weight of the adhesive gel.

The Coloring Agents or Dyes

The coloring agents used in this invention are water soluble and preferably are conventional certified food colors such as the triphenyl methane class of colors, e.g., FD&C Green No. 3 or FD&C Blue No. 1. Chemically, FD&C Green No. 3 is the disodium salt of 4{[4(-N-ethyl-p-sulfobenzyl amino )-phenyl]-(4-hydroxy-2-sulfonium phenyl)-methylene}-[1-N-ethyl-N-p-sulfobenzyl)-$\Delta^{2,5}$-cyclohexadienimine]. Chemically, FD&C Blue No. 1 is the disodium salt of ethyl[4-[p[ethyl (m-sufobenzyl)amino]-a-(o-sulfophenyl-)benzylidene]- 2,5-cyclohexadien-1-ylidene] (m-sulfobenzyl)ammonium hydroxide inner salt. One supplier of such certified food colors is the Warner-Jenkinson Company of South Plainfield, N.J. FD&C Green No. 3 has a Warner-Jenkinson (W.J.) Code No. 6503 and a common name of Fast Green FCF. FD&C Blue No. 1 has a W.J. Code No. of 5601 and a common name of Brilliant Blue FCF. These products of W.J. are sold as 2% solutions of the coloring agent. The salts of the triphenyl methane class of colors need not be limited to those of sodium but instead can be that of other alkali metals such as potassium as well as other water soluble salts of the triphenyl methane colors.

The quantity of the coloring agent used in the compositions of this invention can vary over a wide range. Generally, a minimum quantity of dye will be used such as to provide a tint of color to the gel. Thus, as a 2% solution of the dye, the quantity of such solution can preferably vary from about 0.05% to 0.00025%. About 0.005% to 0.01% of such 2% solution is particularly preferred. Applicants have found good results with about 0.00875% of the 2% solution.

The Water-Soluble Defoamer

Conventional water-soluble defoamers can be used in this invention such as the polyalkoxylated polyethers e.g., butoxy polyoxyethylene-propoxyl propylene glycol. Silane defoamers can also be used but they can adversely affect transparency of the gel. The quantity of the defoamer is that which is sufficient to eliminate air bubbles in the gel in a concentration which destroys the clarity of the gel. Generally, the quantity of the defoamer varies from about 0.05% to 0.35% by weight of the gel composition. The defoamer also maintains density of the gel, prevents excessive foam in the manufacturing process, and facilitates filling of the dispensers with the gel.

When applied to a substrate in the vertical plane, the gels of this invention do not run due to the thixotropic properties of the gel. Due to the ability of the thixotropic gel to be applied through a small dispenser opening, a thin glue line can be provided on a first substrate such as construction paper which minimizes the amount of adhesive as well as wrinkling of paper upon drying. When a second substrates such as a second piece of construction paper is pressed over the first piece in order to be adhered thereto, the high tack of the gel holds the second substrate in place on the vertical surface. The slow rate of set permits a prolonged period of time for positioning the second substrate such as by sliding of the second surface over the first before fiber tearing adhesive bonds develop between the two substrates which permanently hold the pieces in place.

In order that those skilled in the art may more fully understand the invention presented herein, the following examples are set forth. All parts and percentages in the examples, as well as elsewhere in this application, are by weight, unless otherwise specifically stated. Also, set forth below are procedures for determining "wet tack" and "rate of set".

PROCEDURE FOR DETERMINING WET TACK

This procedure uses blocks of Grade 1 or Grade 2 white pine with each block being 2 inches long, 0.75 inches high and 1.75 inches wide. The grain of the wood is parallel to the length of the block and the sides which are 0.75 inches high and 2 inches long are planed and smooth. Such sides are referred to herein as test sides. Each test side therefor provides a surface of 1.5 square inches.

A series of tests are performed with the above described blocks of wood with two blocks being required for each test. In each test an eye screw is placed in the center of one of the test sides of each block. Gel adhesive is then placed on the opposite side of the eye screw of one of the test blocks so that it covers the entire 1.5 square inches of surface. The test side of the second block opposite the second block eye screw and the side of the first block having the glue thereon are pressed against each other in sliding relationship while being placed in register so that the edges of one block do not extend beyond the edges of the other. A scale is attached to the eye screw of the first block whereas a weight is attached to the eye screw of the second block. The scale is then lifted upwardly by the operator and the two blocks are lifted vertically so as to lift the weight. Thus, The operator lifts the scale by hand which in turn lifts the first block through the eye screw. This in turn lifts the second block due to the wet tack of the adhesive which in turn lifts the weight which is attached to the second block eye screw. This test is repeated with clean blocks of wood and the weight is increased each time until the adhesive between the two blocks fails to lift the second block and its attached weight. The last weight which was lifted in this test is referred to as the quantity of wet tack or simply wet tack of the adhesive. This test measures the wet tack in a direction which is perpendicular to the adhered surfaces. In spite of the lengthy description of this test, it can be performed, and for reliability is performed, rapidly by the operator. The glue, when the wet tack is measured between the blocks of wood is very close to the physical and chemical condition of the glue when it left the dispenser orifice. The wet tack is a measure of what is often referred to as the grabbing power of the adhesive. A minimum amount of wet tack is needed when gluing on substrate to another in a vertical plane, otherwise, the substrate which is not held in place but rather depends on the wet glue for positioning would slip off of the vertical surface of the first substrate. The wet tack of the gel of this invention preferably varies from about 225 g per square inch to over 600 grams per square inch and preferably from about 250 to 500 grams per square inch.

PROCEDURE FOR DETERMINING RATE OF SET

Determinations for the rate of set are performed on a white paper pad. A glue line is placed on smooth white paper of a 5.5×8.5 inches paper pad. The single glue line is placed in about the middle of the pad parallel to the length of the paper. This glue is then spread evenly by the use of a No. 22, WIRE-CATOR which is supplied by the Leneta Company. The WIRE-CATOR is also referred to as a wire wrap rod. The WIRE-CATOR draws down a uniform thickness of film from the single glue line. Use of the No. 22 WIRE-CATOR draws down a glue line to a thickness of 1.5 mil.

A second sheet of the same paper has one of its narrow ends raised so that it can be grasped by the fingers. The second sheet is pressed over the first sheet. The two pieces are then slowly pulled apart by lifting the raised end of the second sheet and holding the first sheet down in place. The time that it takes to encounter fiber tearing bond is the rate of set. The preferred rate of set for the gels of this invention is from about 16 seconds to 35 seconds and preferably from about 18 to 32 seconds.

The values for both the wet tack and rate of set recited herein are obtained at 25° C. and a relative humidity of 35%.

EXAMPLE 1

This example shows the composition, preparation and properties of an adhesive gel of this invention.

| Ingredient | Parts By Weight |
| --- | --- |
| Deionized water | 83.51 |
| Polyvinyl alcohol[1] | 13.93 |
| Xanthan gum[2] | 0.40 |
| DEFOAMER[3] | 0.25 |
| Ethyl parahydroxybenzoate | 0.05 |
| Benzoic Acid | 0.10 |
| Propylene Glycol | 1.75 |
| Blue dye[4] | 0.01 |

[1] VINOL 523 which is a partially hydrolyzed polyvinyl alcohol supplied by Air Products and Chemicals, Inc.
[2] KELZAN, an industrial grade xanthan gum supplied by the Kelco Division of Merck & Co.
[3] DEFOAMER 622 which is a monofunctional polyalkoxylated polyether defoamer supplied by the Thomas W. Dunn Corp of Ridgefield, N.J.
[4] No. 5601, FD&C Blue No. 1 which is supplied by Warner Jenkinson Cosmetic Colors of South Plainfield, New Jersey.

The adhesive of EXAMPLE 1 was prepared by conventional techniques of mixing the various ingredients. A preferred method is as follows. Slowly add the polyvinyl alcohol and xanthan gum to water under fast agitation in a jacketed tank equipped with agitators. The gum is preferably blended with a portion of the polyvinyl alcohol before addition to the water. The defoamer is then added. A small portion of the total amount of water in the gel can be obtained from steam condensation when the mixture is heated in contact with steam. The ethyl parahydroxybenzoate and benzoic acid are then mixed in the composition and the temperature of the mixture is raised to 85° C. to 90° C. with slow agitation for about 15 to 20 minutes until the composition is smooth and homogeneous. The composition is then cooled to 50° C. with continued slow agitation. The blue dye is then added. Mixing is continued until the batch color is uniform.

The adhesive can then be filled into conventional 3 fluid ounce clear, low density polyethylene tubes, or such 4 fluid ounce bottles, having a cap and nozzle with an opening of about 0.073 inches in diameter. The portion of the tube or bottle in direct contact with the gel is transparent with a slight blue tint. The portion of tube or bottle which is not in direct contact with the gel is translucent.

The adhesive gel of Example 1 was transparent with a blue tint, easily dispensed with finger-pressure from a conventional resilient plastic tube or bottle having an orifice of 0.073 inches diameter. It was free of air bubbles, and when dispensed from such tube and orifice on to a sheet of paper held vertically, it formed a uniform, thin, horizontal bead of adhesive which did not run and formed fiber tearing adhesive bonds on drying to a clear film. The gel can be dispensed in a steady stream through the dispenser orifice. The strong wet tack held a second sheet of paper in place on the vertical surface while the lengthy time of set permitted sliding and repositioning of the second sheet on the first before permanent adhesive bonds were formed. The gel washed out of clothing both before and after drying. It had a pH of about 4.6, a 15.4% solids content, a W.P.G. (weight per gallon) of 8.5 pounds and a thixotropic index of about 2.3 initially and 1.95 on standing for about 12 hours. The viscosity of the adhesive gel when measured at 25° C. with an RVF Brookfield viscometer with a No. 6 spindle was as follows:

Initially, after manufacture, and at a speed of 2 RPM, a viscosity of about 25,000 cps;

Initially, after manufacture, and at a speed of 20 RPM, a viscosity of about 11,000 cps;

After standing for about 12 hours and at a speed of 2 RPM, a viscosity of about 20,000 cps;

After standing for about 12 hours and at a speed of 20 RPM, a viscosity of about 10,250 cps.

By substituting the same quantity of FD&C Green No. 3 dye in place of the Blue dye, a gel is prepared having substantially the same properties of EXAMPLE 1 above with a light green color in place of the blue color.

EXAMPLE 2

This example provides another formulation of the clear gels of this invention. The blue dye, xanthan gum, polyvinyl alcohol and defoamer were the same as in EXAMPLE 1 above.

| Ingredient | Parts By Weight |
| --- | --- |
| Deionized water | 83.51 |
| Blue dye | 0.01 |
| Polyvinyl alcohol | 14.03 |
| Xanthan gum | 0.30 |
| Defoamer | 0.25 |
| Ethyl parahydroxybenzoate | 0.05 |
| Benzoic acid | 0.10 |
| Propylene glycol | 1.75 |

After standing for about 12 hours, this gel had a viscosity of 17,500 cps at 2 RPM and 7,750 cps at 20 RPM when measured at 25° C. with a Brookfield RVF viscometer having a No. 6 spindle. The thixotropic index was 2.25.

EXAMPLE 3

This example illustrates another formulation of this invention.

| Ingredient | Parts By Weight |
| --- | --- |
| Deionized water | 84.01 |
| Blue dye | 0.01 |
| Defoamer | 0.25 |
| Polyvinyl alcohol | 13.33 |
| Xanthan gum | 0.50 |
| Propylene Glycol | 1.75 |
| Benzoic acid | 0.10 |
| Ethyl parahydroxybenzoate | 0.05 |

The blue dye, polyvinyl alcohol, defoamer and xanthan gum used in EXAMPLE 3 were the same as that of EXAMPLE 1. The formulation of this EXAMPLE 3 had a viscosity as measured immediately after manufacture of 27,500 cps at a speed of 2 RPM and 9,500 cps at a speed of 20 RPM for a thixotropic index of 2.9, a pH of 4.6, a 14.8% solids content and a W.P.G. of 8.6 pounds. After standing overnight, this gel had a viscosity of 30,000 cps at a speed of 2 RPM and a viscosity of 10,750 cps when measured at 20 RPM for a thixotropic index of 2.8. The above viscosities are measured at 25° C. with an RVF Brookfield viscometer with a No. 6 spindle.

EXAMPLE 4

This example illustrates a composition of this invention which contains a substantial quantity of polyvinylpyrrolidone. The blue dye and defoamer were the same as in EXAMPLE 1.

| Ingredient | Parts By Weight |
| --- | --- |
| Deionized Water | 83.51 |
| Defoamer | 0.25 |
| Polyvinyl alcohol | 7.27 |
| Xanthan gum | 0.40 |
| Polyvinylpyrrolidone* | 6.66 |
| Propylene Glycol | 1.75 |
| Blue dye | 0.01 |
| Ethyl parahydroxybenzoate | 0.05 |
| Benzoic acid | 0.10 |

*LUVISCOL K-90 which is supplied by B.A.S.F. Aktiengesellschaft.

EXAMPLE 5

This example illustrates another composition of this invention.

| Ingredient | Parts by Weight |
| --- | --- |
| Deionized water | 83.51 |
| FD&C Blue No. 1 | 0.01 |
| Polyvinyl alcohol | 13.33 |
| Xanthan gum[1] | 1.00 |
| Defoamer | 0.25 |
| Ethyl parahydroxybenzoate | 0.05 |
| Benzoic acid | 0.10 |
| Propylene glycol | 1.75 |

[1]KELZAN, an industrial grade xanthan gum supplied by the Kelco Division of Merck & Co.

The gel of EXAMPLE 5 was clear and had a viscosity of 62,000 cps and 13,500 cps for a thixotropic index of about 4.6. The viscosity was measured at 25° C. by use of a Brookfield RVF viscometer with a No. 6 spindle after the gel was undisturbed for about 12 hours. This product had a wet tack of 400 grams per square inch.

EXAMPLE 6

This example shows incompatibility of hydroxypropyl methylcellulose as the thickening agent polymer. This formulation was unsatisfactory since a thick layer of the hydroxypropyl methylcellulose separated and formed on top of the sample.

| Ingredient | Parts by Weight |
| --- | --- |
| Deionized water | 83.51 |
| FD&C Blue No. 1 (2% aqueous solution) | 0.01 |
| Polyvinyl alcohol | 13.33 |
| Hydroxypropyl methylcellulose* | 1.00 |
| Defoamer | 0.25 |
| Ethyl parahydroxybenzoate | 0.05 |
| Benzoic acid | 0.10 |
| Propylene glycol | 1.75 |

*METHOCEL K 15 MS which is supplied by the Dow Chemical Co. Apart from the hydroxypropyl methylcellulose, the remaining ingredients were the same as that of EXAMPLE 1.

EXAMPLE 7

The substitution of hydroxyethyl cellulose for the hydroxymethyl cellulose of the formulation in EXAMPLE 6 also gave unsatisfactory results since a thick layer of the hydoxyethyl cellulose separated out of the formula.

EXAMPLE 8

The gel of EXAMPLE 1 above, was compared with a gel having 1% of CMC as the thickening agent. The composition of the two gels was otherwise the same except that 0.6% less of the polyvinyl alcohol was used in the CMC formulation. The two compositions were placed in clear resilient 4 ounce capacity polyethylene bottles with closed nozzles and left outdoors for four days during intermittent sunshine. The gels containing the CMC had faded in color after the 4 day test period whereas those containing the xanthan gum were unaffected.

EXAMPLE 9

This example shows that loss of color due to ultra violet rays for a gel with CMC was much greater than for a gel containing xanthan gum or sodium alginate. The gels consisted of 1% of either CMC, xanthan gum, or sodium alginate, as indicated in Table 9 below, together with 83.51% of water; 13.33% of polyvinyl alcohol; 0.25% of a defoamer; 0.05% of ethyl parahydroxy benzoate; 0.10% of benzoic acid; 1.75% of propylene glycol; and 0.01% of FD&C Blue No. 1. The gels were in clear 4 ounce polyethylene squeeze bottles. Ultra violet light was provided by a laboratory UV lamp apparatus fitted with a shortwave UV 254 nm bulb (General Electric Co. lamp G8T5). During exposure, all specimens were kept 12 inches away from the UV light bulb. After exposure, all of the specimens were visually compared with specimens unexposed to UV light to determine any color fading. The test result are shown in Table 9 below. It can be seen from the results in Table 9 that loss of color with the gel using CMC as the thickener was greater than the gels with xanthan gum or sodium alginate.

TABLE 9

| Specimen | 24 hrs. Exposure | 40 hrs. Exposure |
| --- | --- | --- |
| Gel with CMC | Moderate fading | Excessive fading |
| Gel with xanthan | No fading | Slight fading |
| Gel with sodium alginate | No fading | Slight fading |

What is claimed is:

1. A thixotropic adhesive gel comprising, by weight
  A. about 70% to 93% water;
  B. about 5% to 25% of partially hydrolyzed polyvinyl alcohol;
  C. about 0.1% to 1.5% of xanthan gum;
  D. a triphenyl methane dye in an amount sufficient to impart color to the composition, and
  E. a water soluble plasticizer in an amount sufficient to plasticize the polyvinyl alcohol.

2. The gel of claim 1 wherein the triphenyl methane dye is a member selected from the group consisting of Fast Green FCF and Brilliant Blue FCF.

3. The gel of claim 2 wherein the dye is Brilliant Blue FCF.

4. The gel of claim 3 wherein the quantity of the dye is equivalent to that of from about 0.05 to 0.00025 of a 2% solution containing the dye.

5. A clear thixotropic adhesive gel consisting essentially of, by weight:
  A. about 75% to 93% of water;
  B. about 5% to 20% of partially hydrolyzed polyvinyl alcohol;
  C. a water soluble plasticizer in an amount sufficient to plasticize the polyvinyl alcohol;
  D. a defoamer in an amount sufficient to prevent air bubbles from destroying the clarity of the gel; and
  E. about 0.2% to 0.8% of xanthan gum.

6. The gel of claim 5 containing Brilliant Blue FCF dye in an amount sufficient to give the gel a blue coloration and wherein the quantity of xanthan gum is from about 0.3% to 0.7%.

7. A clear, thixotropic adhesive gel consisting essentially of, by weight:
  A. about 70% to 93% water;
  B. about 5% to 25% of a partially hydrolyzed polyvinyl alcohol;
  C. about 0.5% to 3% of a water soluble plasticizer for the polyvinyl alcohol;
  D. A water soluble defoamer in an amount sufficient to prevent air bubbles from destroying the clarity of the gel; and E. about 0.1% to 1.5% of xanthan gum.

8. The gel of claim 7 wherein the quantity of gum is from about 0.2 to 0.8%.

9. The gel of claim 7 wherein the plasticizer is an alkane having from 2 to 5 carbon atoms and from 2 to 3 hydroxyl groups.

10. The gel of claim 7 wherein the quantity of water is from about 75% to 93% by weight of the gel and the polyvinyl alcohol is from about 5% to 20% by weight of the gel.

11. The gel of claim 7 wherein from about 5% to 50% of the polyvinyl alcohol is replaced with polyvinylpyrrolidone.

12. The gel of claim 7 wherein the defoamer is a monofunctional polyalkoxylated polyether.

13. The gel of claim 7 wherein the gel can be laundered out of clothing in hot or cold water after it has dried.

14. The gel of claim 7 which contains a sufficient amount of a dye to provide coloration to the gel.

15. The gel of claim 14 wherein the dye is a triphenyl methane dye.

16. The gel of claim 15 wherein the dye is Fast Green FCF.

17. The gel of claim 15 wherein the dye is Brilliant Blue FCF.

18. The gel of claim 7 wherein: the quantity of xanthan gum is sufficient to provide a thixotropic index to the gel of from about 1.5 to 4.5 when viscosity of said gel at 20 RPM is divided into the viscosity at 2 RPM of said gel at 25° C. as measured with an RVF Brookfield viscometer using a number 6 spindle.

19. The gel of claim 18 wherein the thixotropic index is from about 1.5 to 4.0.

20. The gel of claim 7 having a wet tack of at least about 225 grams per square inch and a rate of set of about 16 to 35 seconds at a temperature of 25° C. and a relative humidity of 35%.

* * * * *